US009262898B2

(12) United States Patent  
Champagne et al.

(10) Patent No.: US 9,262,898 B2  
(45) Date of Patent: Feb. 16, 2016

(54) SYSTEM AND METHOD FOR VALIDATING VIDEO SECURITY INFORMATION

(75) Inventors: Jean-Philippe Champagne, Raleigh, NC (US); Matthew R. Gnagy, Incline Village, NV (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1071 days.

(21) Appl. No.: 13/088,994

(22) Filed: Apr. 18, 2011

(65) Prior Publication Data

US 2012/0262575 A1 Oct. 18, 2012

(51) Int. Cl.
*H04N 7/18* (2006.01)
*G08B 13/196* (2006.01)

(52) U.S. Cl.
CPC .......... *G08B 13/19613* (2013.01); *H04N 7/185* (2013.01)

(58) Field of Classification Search
CPC ................... G08B 13/19602; G08B 13/19634; G08B 13/19691
USPC ........................................................ 348/143
See application file for complete search history.

(56) References Cited

U.S. PATENT DOCUMENTS

| 7,508,941 | B1 * | 3/2009 | O'Toole, Jr. ..... | G08B 13/19671 380/228 |
| 2004/0257336 | A1 * | 12/2004 | Hershkovitz ......... | G08B 25/008 345/156 |
| 2008/0030579 | A1 * | 2/2008 | Kelly, III ........... | G06K 9/00771 348/154 |

OTHER PUBLICATIONS

Cisco Systems, Inc. "Cisco Video Surveillance 4000 Series High-Definition IP Cameras," Data Sheet, © 2011, 6 pages, http://www.cisco.com/web/solutions/ps/index.html.
Baugher, M., et al., "The Secure Real-Time Transport Protocol (SRTP)," RFC 3711, Mar. 2004, 53 pages, http://www.ietf.org/rfc/rfc3711.txt.

* cited by examiner

*Primary Examiner* — Andy Rao
*Assistant Examiner* — Obafemi Sosanya
(74) *Attorney, Agent, or Firm* — Patent Capital Group

(57) ABSTRACT

A method is provided in one example and includes receiving video data captured by a camera at a location; comparing a portion of the video data to security information characteristics stored in a policy; and identifying a violation of the policy when the portion of the video data does not match at least one of the security information characteristics stored in the policy. In more particular instances, the method can include triggering an alert when the violation of the policy is identified.

20 Claims, 9 Drawing Sheets

SYSTEM AND METHOD FOR VALIDATING VIDEO SECURITY INFORMATION

TECHNICAL FIELD

This disclosure relates in general to the field of security and, more particularly, to validating video security information.

BACKGROUND

Security cameras are increasingly being used in areas such as banks, casinos, airports, military installations, museums, industrial plants, and other areas where monitoring is needed. A typical security camera monitors activity in an area and then transmits a video of the area through a video feed (e.g., for storage or for monitoring in a control room or some other centralized location). The video from the security camera is often watched by a security guard to ensure that the area being monitored remains secure. It is important that the integrity and the authenticity of video feed from the security camera is not compromised and, further, that the video being watched is an accurate representation of the area needing monitored. However, the ability to authenticate video from the security camera presents a significant challenge to personnel tasked with security responsibilities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving video data captured by a camera at a location; comparing a portion of the video data to security information characteristics stored in a policy; and identifying a violation of the policy when the portion of the video data does not match at least one of the security information characteristics stored in the policy. In more particular instances, the method can include triggering an alert when the violation of the policy is identified.

In other examples, comparing the portion of the video data to the stored security information characteristics includes evaluating a static object at the location. Additionally, the stored security information characteristics can be associated with items such an intensity associated with lights provisioned at the location; color characteristics associated with the lights; a shape associated with an object at the location; an angle associated with the camera; an angle associated with a light source; and a modulation characteristic associated with the lights.

In other implementations, the portion of the video data being compared to the policy is a particular area of frames of the video data. In more specific architectures, the method can include setting the stored security information characteristics in the policy using a graphical interface. Alternatively, the method can include receiving second video data from a second camera; comparing a second portion of the second video data to the stored security information characteristics; and identifying a violation of the policy when the second portion of the second video data does not match at least one of the security information characteristics.

Example Embodiments

Figure 1:
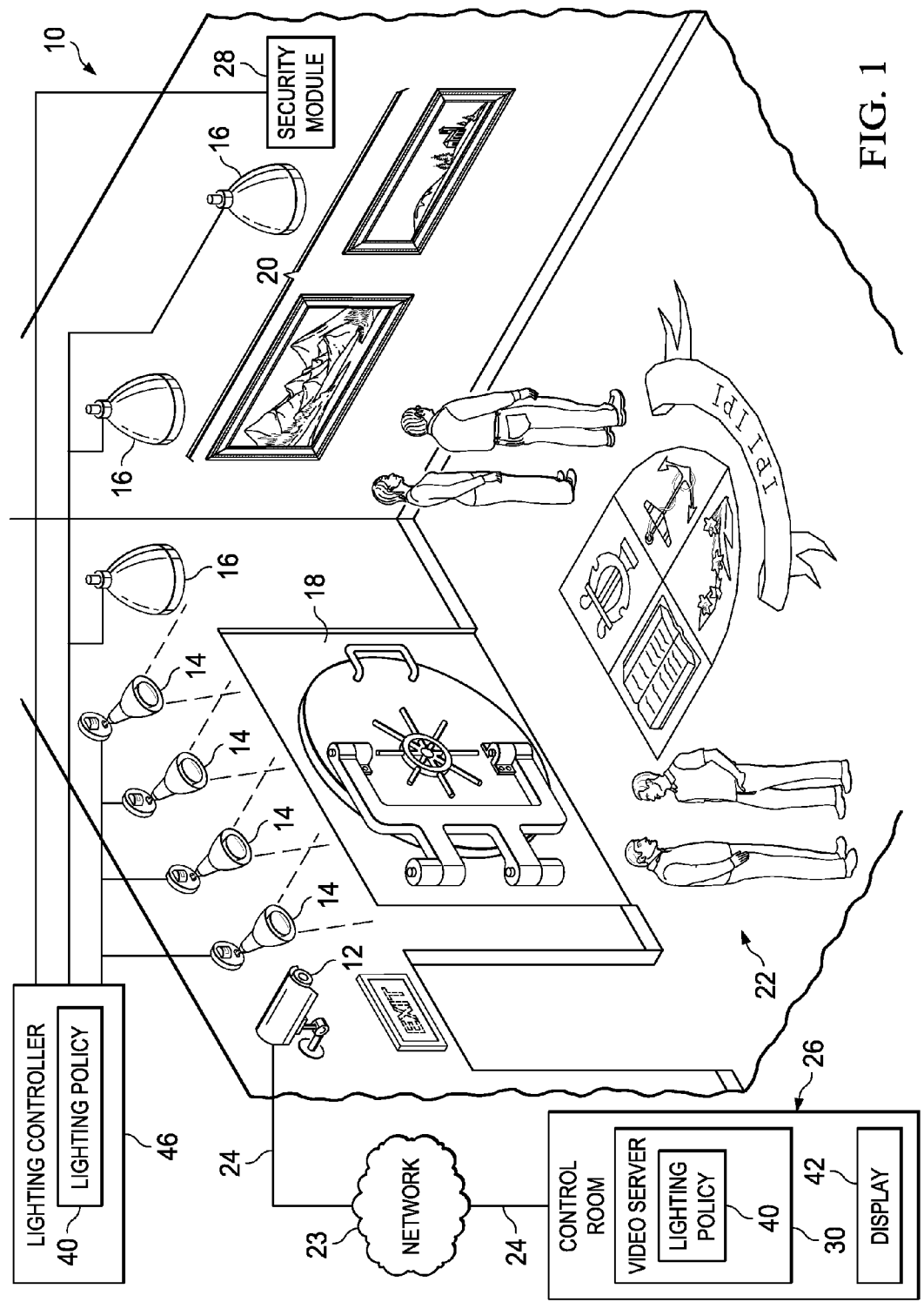
FIG. 1 is a simplified illustrative schematic diagram of a video security system in accordance with one embodiment of the present disclosure.

Turning to FIG. 1, FIG. 1 is a simplified schematic diagram of a video security system 10. FIG. 1 includes a video surveillance camera 12 that monitors an area 22, which needs to be monitored. For example, as shown in FIG. 1, area 22 may contain a vault 18 or a set of valuable artwork 20 that may need to be monitored to prevent theft. In other examples, area 22 may be a bank, a casino, an airport, a military installation, a museum, an industrial plant, a warehouse, a break room, or any other location where activity may need to be monitored. Video surveillance camera 12 captures a video of area 22 and transmits the captured video on a video feed 24 (or link) to a control room 26. Inside control room 26, the authenticity of the video can be verified by a video server 30 and/or verified through an individualized inspection by appropriate security personnel watching the video being rendered on a display 42.

Also provided in FIG. 1 are floodlights 14 (that illuminate at least a portion of area 22) and at least one room light 16. Room light 16 may illuminate area 22, a portion of area 22, or the output of room light 16 may not be detectable by a person in area 22 (e.g., infrared), but the output can be detectable by video surveillance camera 12. In yet another particular embodiment, a security module 28 is present in area 22. Security module 28 can be configured to emit a security indicator that is detectable by video surveillance camera 12 in particular implementations of the present disclosure. [Note that a series of example security modules are illustrated in FIGS. 4A-4E and detailed below.] Separately, a lighting controller 46 can use a lighting policy 40 to modulate the output of floodlights 14, room light 16, and/or security module 28 collectively, individually, or in any suitable combination.

Video surveillance camera 12 is configured to capture video of area 22, along with the output of floodlights 14, room light 16, and/or security module 28. The video captured by video surveillance camera 12 can be processed into video feed 24 and sent through a network 23 to control room 26. Video server 30 can contain the same lighting policy 40, where video server 30 is configured to analyze incoming video to determine if the modulated output of floodlights 14, room light 16, and/or security module 28 match characteristics outlined in lighting policy 40.

If the video being captured matches security information provided in a particular lighting policy (e.g., stored in video server 30), then the video can be validated such that further action would not be required. However, if the video being captured does not match that which is provided in the lighting policy, then a violation of a policy is detected. In such a scenario, the video cannot be validated, which triggers a suitable remedial action being taken. Hence, video security system 10 can be used to verify the integrity/authenticity of video feed 24 from video surveillance camera 12 and, further, to verify that the video being shown on display 42 is indeed the same video of area 22 being captured by video surveillance camera 12 (e.g., in real time).

For purposes of illustrating certain example techniques of video security system 10, it is important to understand a video surveillance system and how captured video can be transmitted to a next destination (e.g., to a control room). The following foundational information may be viewed as a basis from which the present disclosure may be properly explained. Typically, in a video surveillance system, a video feed from a video surveillance camera is transmitted unencrypted and without authentication of any form. Access to the video surveillance camera is presumed to be secure. However, a nefarious person could have access to the wires or to wireless signals used to transmit the video feed and, therefore, that individual has the opportunity to change the video feed being sent to a control room (e.g., switching to an alternate video feed, which may be a static feed).

In addition, the video surveillance camera's input, or view, could be altered with an alternative image feed in front of the video surveillance camera. Hypertext transfer protocol secure (HTTPS), secure real-time transport protocol (SRTP), and other forms of encryption may be used between the video surveillance camera and the video control room. However, the forms of encryption do not authenticate the validity of the input to the video surveillance camera. Hence, the video captured by the video surveillance camera could easily be compromised, misappropriated, or otherwise manipulated.

In accordance with one example implementation, video security system 10 can resolve the aforementioned issues associated with ensuring the input to, or video captured by, a video surveillance camera is not compromised. More specifically, a lighting policy can be used to modulate the output of floodlights, a room light, and/or a security module in an area being monitored by the video surveillance camera. Video of the modulation and of the area being monitored is captured by the video surveillance camera. The captured video can be transmitted on a video feed from the video surveillance camera to a control room. Inside the control room, a video server can be configured to compare the modulated output of floodlights, the room light, and/or the security module in the video feed to stored image characteristic data (e.g., in one specific case, the lighting policy). If the modulated output matches the stored image characteristic data (e.g., in the lighting policy), then the video in the video feed can be properly validated.

In one example operation, lighting controller 46 directs floodlights 14 to modulate the intensity and/or color emitted from floodlights 14. The video includes the video of area 22 and the modulating intensity and/or color emitted from floodlights 14. At video server 30, the modulating intensity and/or color emitted from floodlights 14 in the video is compared to lighting policy 40. If the modulating intensity and/or color emitted from floodlights 14 matches lighting policy 40, then the integrity and the authenticity of the video can be validated.

In another example operation, lighting controller 46 directs room light 16 to modulate the intensity and/or color emitted from room light 16. The video includes video data of area 22 and the modulating intensity and/or color emitted from room light 16. At video server 30, the modulating intensity and/or color emitted from room light 16 in the video can be compared to lighting policy 40. If the modulating intensity and/or color emitted from room light 16 matches lighting policy 40, then the integrity and the authenticity of the video can be validated.

In another example operation, that leverages lighting policy 40, lighting controller 46 directs security module 28 to control the security indicators emitted from security module 28. The video includes video data of area 22 and the security indicators emitted from security module 28. At video server 30, the security indicators emitted from security module 28 in the video can be compared to lighting policy 40. If the security indicators emitted from security module 28 match those characteristics outlined in lighting policy 40, then the integrity/authenticity of the video can be validated. The security indicators emitted from security module 28 may include modulation of intensity, colors, shapes, numbers, letter, symbols, or any combination thereof.

Figure 2A:
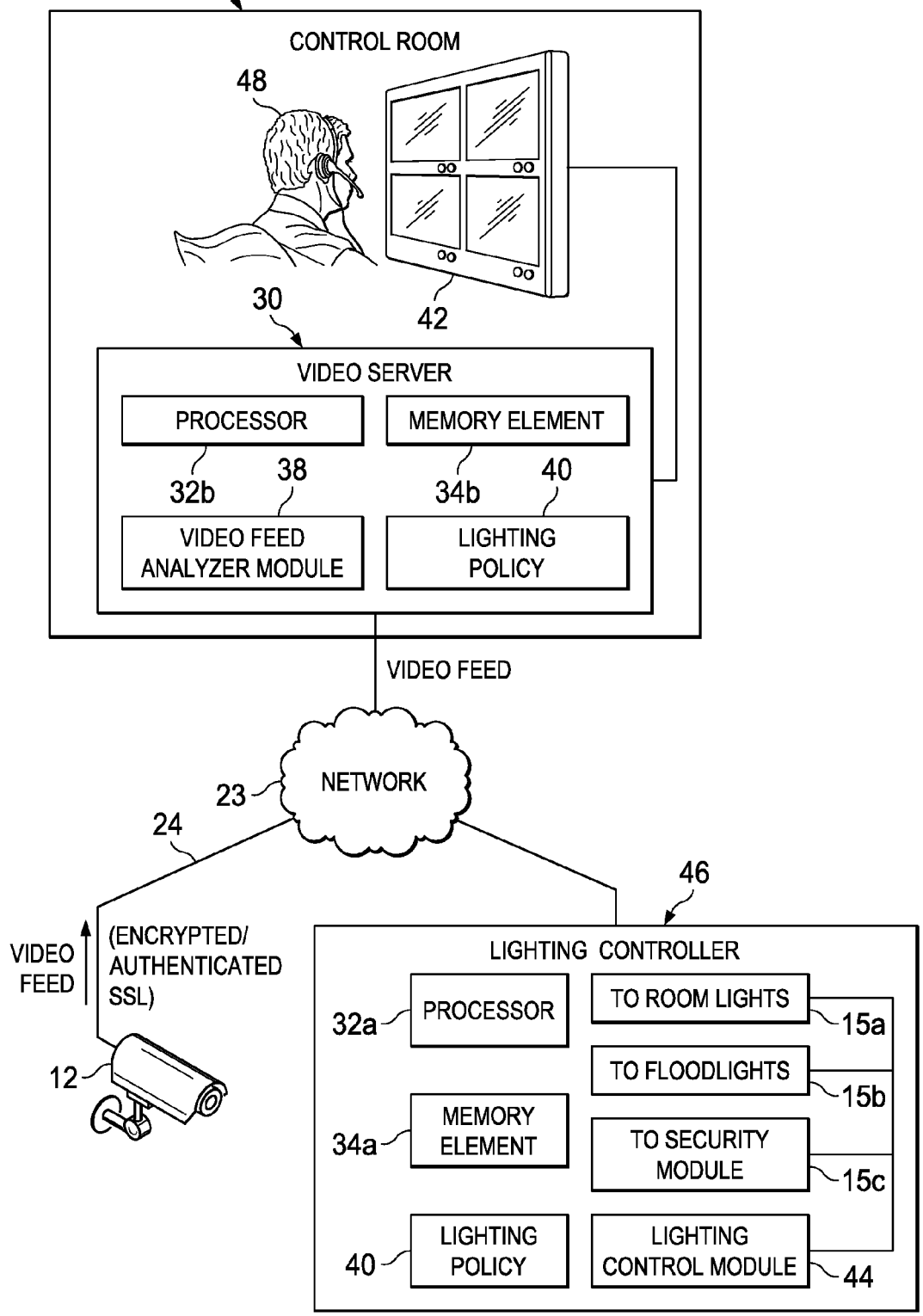
FIG. 2A is a simplified block diagram illustrating possible example details associated with the video security system in accordance with one embodiment of the present disclosure.

Turning to FIG. 2A, FIG. 2A is a simplified block diagram illustrating one possible set of details associated with video security system 10. FIG. 2A includes lighting controller 46, which may include individual controls to room lights, to floodlights, and to the security module (being illustrated as 15a-c in FIG. 2A). Hence, lighting controller 46 is configured to manage floodlights 14, room light 16, and/or security module 28 (for example) through a lighting control module 44. In this particular implementation, lighting controller 46 can include a respective processor 32a, a respective memory element 34a, and lighting policy 40.

FIG. 2A further includes video server 30, which can include a respective processor 32b, a respective memory element 34b, an instance of lighting policy 40, and a video feed analyzer module 38. Operationally, video server 30 can be configured to receive a video feed, which may be suitably authenticated/encrypted (e.g., using a secure sockets layer (SSL) protocol). The term memory element is inclusive of any volatile or persistent medium, such as an electrical circuit, magnetic disk, or optical disk, in which a computer can store data or software for any duration. The memory elements can store any appropriate information and, in certain implementations, may contain lighting policy 40. Before discussing potential uses associated with the architectures of FIG. 1-2A, a brief discussion is provided about some of the possible infrastructure that may be included within video security system 10.

Network 23 represents a series of points or nodes of interconnected communication paths for receiving and transmitting packets of information that propagate through video security system 10. Network 23 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Network 23 may implement a UDP/IP connection and use a TCP/IP communication language protocol in particular embodiments of the present disclosure. A network can comprise any number of hardware or software elements coupled to (and in communication with) each other through a communications medium. Network 23 contains the network elements to facilitate video security system 10.

Video server 30 and lighting controller 46 are network elements in a particular embodiment of the present disclosure. Each network element may include any suitable hardware, software, components, modules, interfaces, or objects operable to exchange information in a network environment. Hence, the term network element includes devices such as routers, switches, gateways, bridges, load-balancers, firewalls, inline service nodes, proxies, clients, servers, processors, modules, or any other suitable device, component, element, proprietary appliance, or object operable to exchange information in a network environment. This may be inclusive of appropriate algorithms and communication protocols that allow for the effective exchange of data or information.

In one particular embodiment, video security system 10 can be associated with a local area network (LAN). Alternatively, video security system 10 would be equally applicable to other network environments and, further, be associated with a service provider digital subscriber line (DSL) deployment, an enterprise wide area network (WAN) deployment, cable scenarios, broadband generally, fixed wireless instances, fiber to the x (FTTx), which is a generic term for any broadband network architecture that uses optical fiber in last-mile architectures. Note that the terms 'video feed' and 'video data' are broad and inclusive of any type of video, media, or script data, or any other suitable information in any appropriate format that may be communicated from one point to another.

In operational terms, one or more devices that emit a light with variable intensity (and/or color based on a modulation algorithm) may be placed in area 22, where video surveillance camera 12 can capture the emitted light. For example, floodlights 14, room light 16, or security module 28 may emit a light with variable intensity and/or color into area 22. The emitted light can be captured by video surveillance camera 12, where a video is transmitted to control room 26 for inspection by an administrator 48. Video feed analyzer module 38 can be used to analyze the captured video in order to verify the integrity/authenticity of the signal, which is being viewed by administrator 48. Administrator 48 can simply be any individual (e.g., with the proper authority) within the proximity, or within the field of view, of display 42. For example, administrator 48 may be security personnel. In one particular embodiment, display 42 may be outside the control room, for example, in a separate monitoring room or provisioned on a mobile screen (such as a smartphone or a personal digital assistant (PDA), etc.).

Display 42 offers a screen at which video data can be rendered for administrator 48. Note that as used herein in this Specification, the term 'display' is meant to connote any element that is capable of delivering image data (inclusive of video information), text, sound, audiovisual data, etc. to an end user (e.g., administrator 48). Display 42 would necessarily be inclusive of any panel, plasma element, television, monitor, computer interface, surface, screen, or any other suitable element that is capable of delivering/rendering/projecting such information.

In one particular embodiment, the actual mechanism to generate the modulation of floodlights 14, room light 16, and/or security module 28 is based on frequency modulation in which a byte stream can be converted into a frequency. For example, if the byte stream is 0x83, 0x24, 0xA9, 0xF0, 0xAA, 0xA9, and 0x33, then byte 0x00 to byte 0xFF can represent a specific frequency for which the emitted light would vary. It should be noted that the modulation frequency of the light or lights should fall into a range that video surveillance camera 12 can detect or capture. Changes in the modulation frequency should be slow enough for video surveillance camera 12 to distinguish between each modulation. For example, if a video surveillance camera is capturing 30 images/second, an image is being taken about every 33 milliseconds (msec). In one particular example, approximately four images could be used to capture the modulation frequency. Hence, 133 msec could be a minimum modulation frequency designation for this type of camera arrangement. However, it should be noted that the minimum modulation frequency depends, at least in part, on the video surveillance camera's images per second, which can vary based on a particular deployment, on a particular type of link, or be based on a particular application, environment, network characteristics, device (inclusive of a particular type of camera, or other associated equipment), etc.

In another embodiment, the byte stream can be split into a 4-bit integer (e.g., 0x8, 0x3, 0x2, 0x4, 0xA, and 0x9 from the example above) to produce a lower granularity on the variation of frequency. In yet another embodiment, the byte stream could be numeric/digital in nature with a specific amplitude for each encoded value or a specific amplitude for each color. For example, each number between 0x01 to 0xFF could designate a specific color and/or a particular degree of lighting (Lux units). The specific color and the degree of lighting can remain static long enough for video surveillance camera 12 to take one image (e.g., less than 1/30 sec for a 30 images/second camera). In one particular embodiment, an encrypted/authenticated signal using secure sockets layer (SSL) (or another suitable encryption method) is used to generate the modulation frequency of the light. After receiving the encrypted/authenticated signal, lighting controller 46 decrypts the signal and then uses the byte stream to modulate the floodlights, the room light, and/or the security module. The encrypted/authenticated signal may be sent over a wire, or it may propagate wirelessly. In another embodiment, lighting controller 46 may contain a stored password or passcode that can be used to generate the feed for the frequency modulation. The modulation frequency may be as simple as a pseudorandom generator, the encryption of a specific document, or the encryption of a stream of zeros that is used to generate the modulation frequency.

Video feed analyzer module 38 in control room 26 is configured to use lighting policy 40 to validate the modulation frequency signal observed. In a particular embodiment, video feed analyzer module 38 analyzes a specific area (or a particular frame) of the video to validate the modulation frequency signal observed in the video. [For example, the video data being compared to a given policy can be a particular area of frames of the video data.] If the modulation frequency in the video from the video feed matches the one from lighting policy 40, then the video can be suitably validated. In a particular embodiment, the modulation frequency is used to encrypt the video from video surveillance camera 12, where the encrypted video feed can be sent to control room 26. In control room 26, video feed analyzer module 38 uses the modulation frequency to decrypt the video and, then, suitably validate the video.

The choice of the light emitted from floodlights 14, room light 16, and/or security module 28 can be monochrome, a variation of colors for non-black and white video surveillance, or any other suitable color arrangements. If floodlights 14, room light 16, and/or security module 28 provide single colors, the variation of color can also be dictated by the byte stream. As an example, the initial first four bits can dictate the color, while the last four bits can dictate the frequency of the variation (or modulation). In a particular embodiment, infrared light may be used, or some other emission may be provisioned, which is not detectable by an observer, but which would be detectable by video surveillance camera 12. Using infrared light may be advantageous because it would not be obvious (or bothersome) to observers in the area being monitored.

In another example, the emitted light could be lighting a protected static object. Hence, the reflection on the object could be analyzed by video feed analyzer module 38 in control room 26. In this example, the subtlety of the lighting may become more important and the variation of the lighting may be provisioned to be less noticeable to the human eye to minimize disruption for individuals in the area.

In another example, an additional protection could be utilized by verifying the specific angle of a source light. This additional protection could add another layer of security to help prevent elaborate schemes that attempt to compromise the video data. In one example, two video surveillance cameras can be provisioned, where a first video surveillance camera would be configured to view/monitor a second video surveillance camera. In another example, a first video surveillance camera is capable of moving laterally and a second video surveillance camera is capable of detecting the lateral movement of the first video surveillance camera.

Figure 2B:
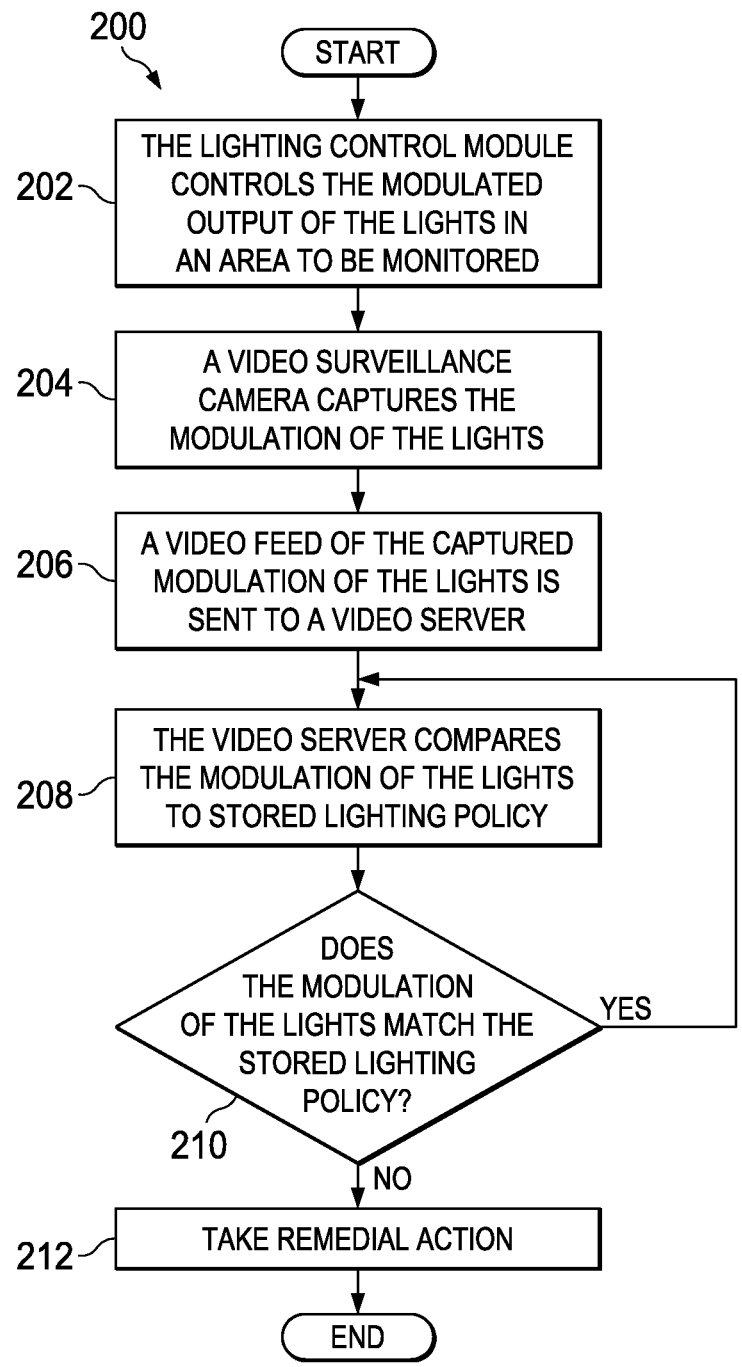
FIG. 2B is a simplified flow diagram illustrating potential operations associated with one embodiment of the present disclosure.

Turning to FIG. 2B, FIG. 2B is a simplified flowchart 200 illustrating one potential operation associated with the present disclosure. In 202, the lighting policy control module controls the modulated output of the lights in an area to be monitored. For example, lighting control module 46 may use lighting policy 40 to control floodlights 14, room light 16, and/or security module 28. In 204, a video surveillance camera captures the modulation of the lights. This could involve video surveillance camera 12 capturing the modulating intensity and/or color emitted from floodlights 14, room light 16, and/or security module 28 in area 22. In 206, a video feed of the captured modulation of the lights is sent to a video server.

In 208, the video server compares the modulation of the lights to a stored lighting policy. In 210, the video server determines if the modulation of the lights matches the security information stored in lighting policy. For example, video server 30 determines if the modulating intensity and/or color emitted from floodlights 14, room light 16, and/or security module 28 in the video matches lighting policy 40. If the video server determines that the modulation of the lights matches that which is found in the stored lighting policy, then the video server continues to compare the modulation of the lights to the stored lighting policy, as illustrated in 208. However, if the video server determines that the modulation of the lights does not match the stored lighting policy, then the video server can take suitable remedial action in 212. For example, if video server 30 determines that the modulating intensity and/or color emitted from floodlights 14, room light 16, and/or security module 28 in video feed 24 does not match characteristics found in lighting policy 40, then video server 30 may sound an alarm, notify administrator 48 (e.g., through short message service (SMS) text, through e-mail, through a walkie-talkie, through a phone call to a landline or a smartphone, etc.), or engage in any other appropriate alert.

Figure 2C:
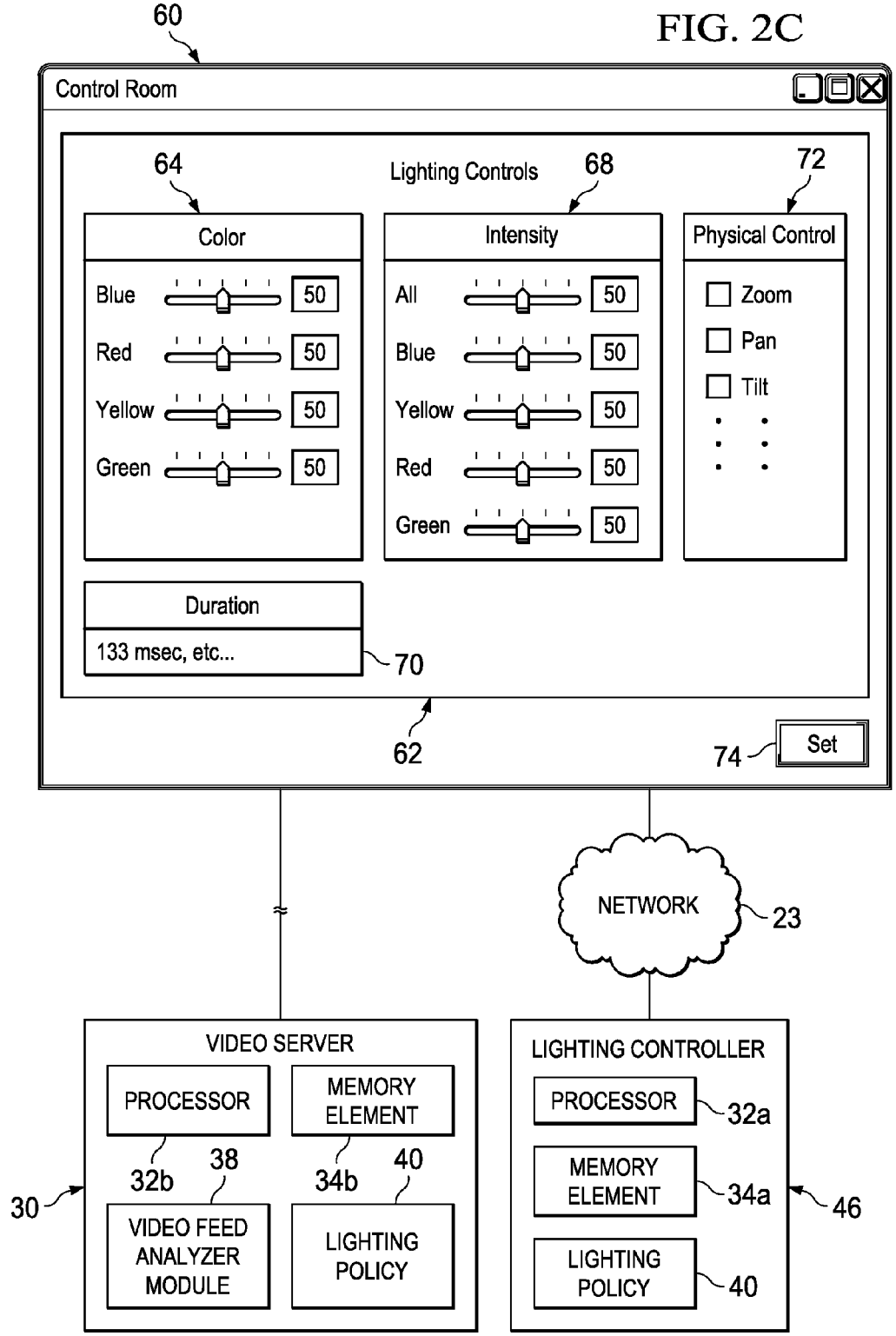
FIG. 2C is a simplified block diagram illustrating possible example details associated with one embodiment of the present disclosure.

Turning to FIG. 2C, FIG. 2C is a simplified block diagram illustrating one possible graphical user interface (GUI) 60, which can be used to set lighting policy 40 to control the modulating intensity and/or color emitted from floodlights 14, room light 16, and/or security module 28. GUI 60 may be displayed in control room 26 on display 42. From GUI 60, administrator 48 can access and modify a set of lighting controls 62, which may include a color control 64, an intensity control 68, and a physical control 72. Operationally, lighting controls 62 can allow administrator 48 to set the color of the lighting through color control 64, the intensity of the lighting through intensity control 68, the duration between changes in the intensity and/or color of the lighting through a duration control 70, and the physical movement of video surveillance camera 12 through physical control 72. After the lighting policy is configured using GUI 60, a soft button (e.g., a set icon 74) can be selected such that the set lighting policy is sent (e.g., over a network connection) to lighting policy 40 in both video server 30 and lighting controller 46.

In a particular embodiment, GUI 60 is in direct communication with lighting controller 46 and video server 30 such that the set lighting policy does not need to be sent over a network. In another particular embodiment, GUI 60 is not connected to either lighting controller 46 or video server 30 and the lighting policy in lighting controller 46 and video server 30 is updated using a portable memory device (e.g., a Universal Serial Bus (USB) flash drive).

Figure 3A:
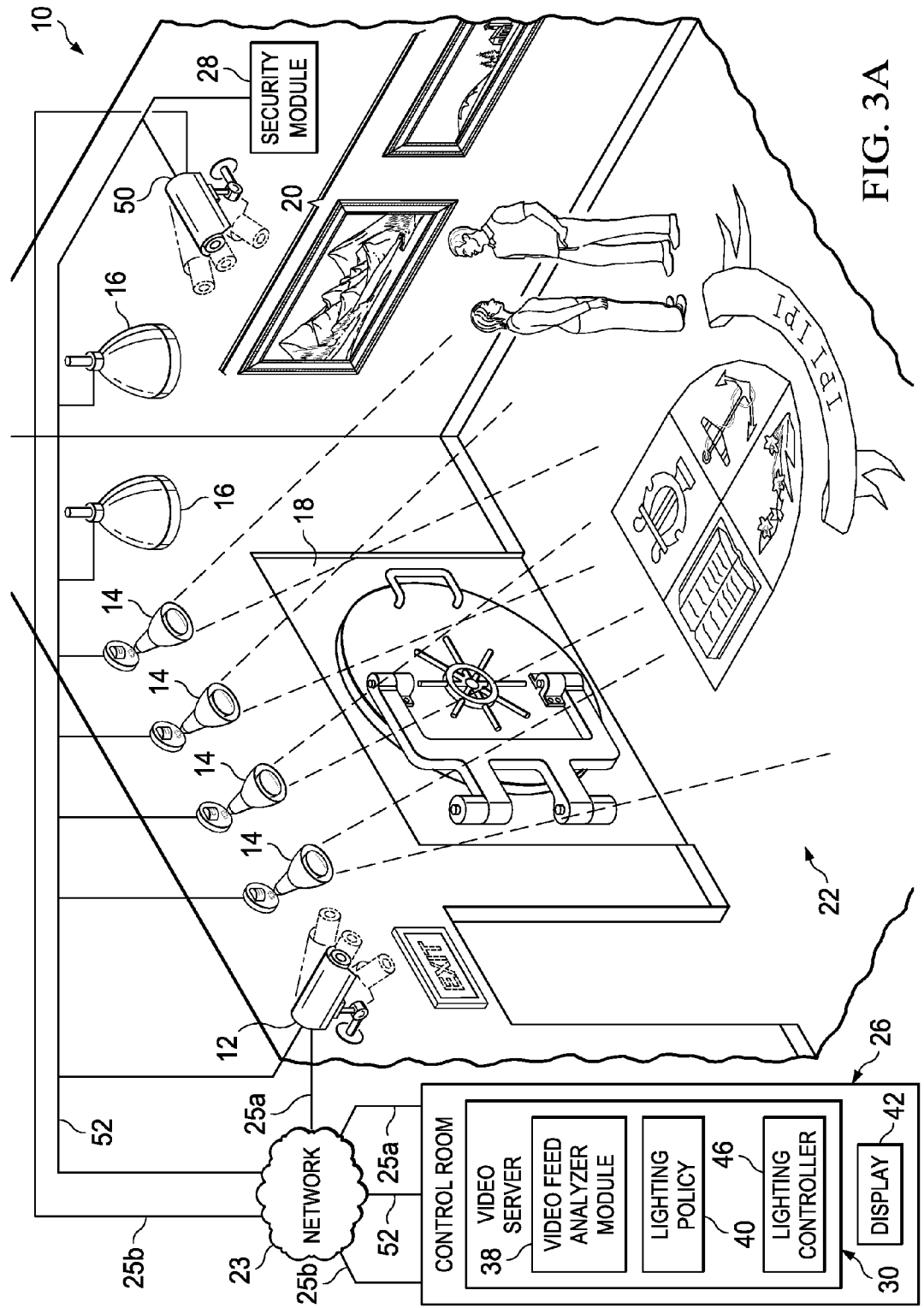
FIG. 3A is another simplified schematic diagram illustrating one potential operation associated with one embodiment of the present disclosure.

Turning to FIG. 3A, FIG. 3A is a simplified schematic diagram illustrating one possible set of details associated with validating video data. FIG. 3A includes area 22, which in this instance includes a second video surveillance camera 50. Through a lighting control signal (e.g., propagating over a link 52), lighting controller 46 uses lighting policy 40 to modulate the output of floodlights 14, room light 16, and/or security module 28 collectively, individually, or in any suitable combination. Lighting controller 46 also uses lighting policy 40 to modulate any physical movement of video surveillance camera 12 and second video surveillance camera 50 such as tilt, pan, zoom, or any other physical movement of video surveillance camera 12 and/or second video surveillance camera 50.

In operation, video surveillance camera 12 is configured to capture video of area 22: inclusive of any physical movement of second video surveillance camera 50, along with the modulated output of floodlights 14, room light 16, and/or security module 28. Similarly, second video surveillance camera 50 can capture the video of area 22, any physical movement of video surveillance camera 12, and the modulated output of floodlights 14, room light 16, and/or security module 28. The video captured by video surveillance camera 12 can be processed into a video feed, which may propagate along a video feed 25a to control room 26. The video captured by second video surveillance camera 50 can propagate along a video feed 25b to control room 26. Display 42 can use the incoming video feeds to render the video for inspection by appropriate security personnel.

In one particular embodiment, video server 30 uses video feed analyzer module 38 to analyze the video feeds to determine if the modulated output of floodlights 14, room light 16, and/or security module 28 matches lighting policy 40. In another particular embodiment, video server 30 uses video feed analyzer module 38 to analyze the video feeds to determine if the physical movement of either video surveillance camera 12 or second video surveillance camera 50 matches stored security information contained in lighting policy 40. The stored security information contained in lighting policy 40 can include information associated with tilt, pan, zoom, or any other physical movement of video surveillance camera 12 or second video surveillance camera 50. Note that as used herein in this Specification, the term 'security information characteristics' (such as that which can be provided in a suitable policy) is a broad term that can encompass all of the aforementioned characteristics (e.g., lighting intensity, modulation, shape, angle of video, angle of light source, angle of camera, static object parameters, color, frequency, infrared data, pan/tilt/zoom of any camera, duration characteristics, the presence or absence of static objects, security modules that have certain properties, or that emit certain light waves, etc.), as well as other characteristics associated with a particular location, or particular equipment, or particular environmental parameters.

In alternative embodiments, audio patterns can be provided in the policy such that discrepancies between that which is being captured at the location, and that being stored as audio data in the policy, can be suitably identified. This could also involve provisioning a certain audio device at the location in order to capture the presence (or the absence) of expected audio information (e.g., an alarm being sounded at a particular time of day, beeping sounds that would aid in the authentication/verification of the video feed, air-conditioning noises in particular environments, humming sounds associated with particular industrial equipment, or any other suitable audio data that can be used for authentication/verification purposes). In still other instances, a sound generating device may be provisioned in the area such that pseudorandom noises could be generated to be matched against audio data stored in the policy. The sound generating device could be programmed to make specific noises at designated times such that a camera could capture this audio information, which can be matched to a policy in order to verify the video feed.

Figure 3B:
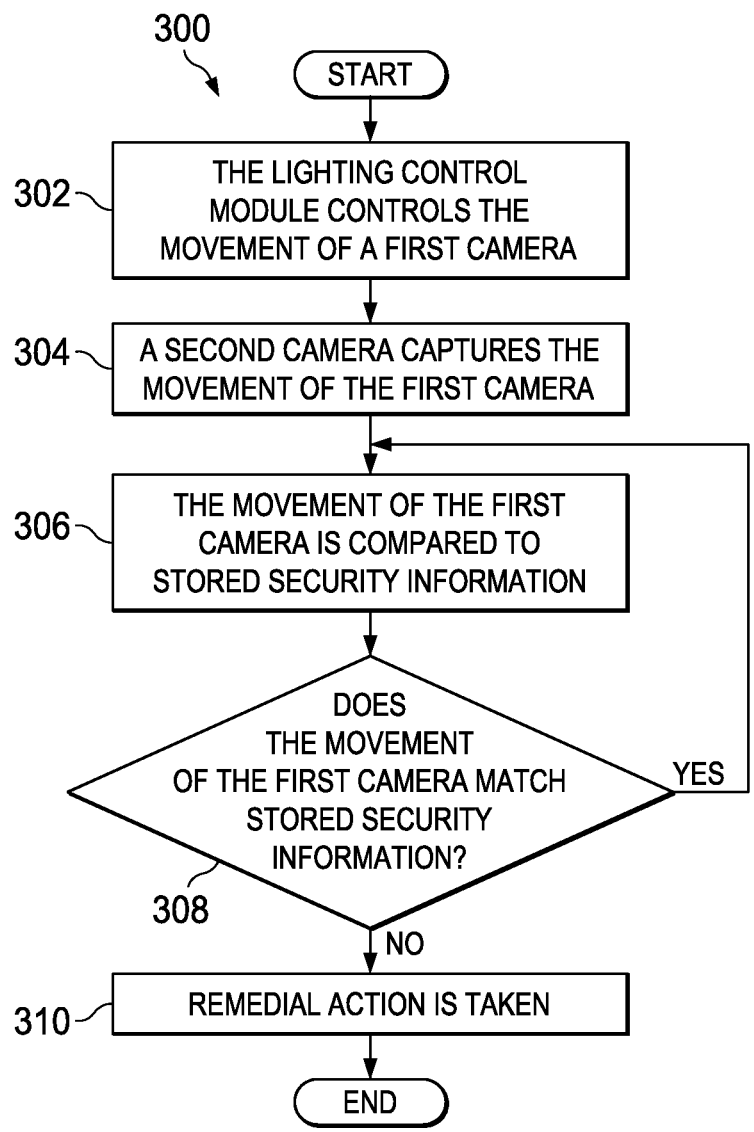
FIG. 3B is a simplified flow diagram illustrating potential operations associated with one embodiment of the present disclosure.

In operation of another example flow, FIG. 3B is a simplified flowchart 300 illustrating one potential operation associated with the present disclosure. In 302, the lighting policy control module controls the movement of a first camera. In 304, a second camera can capture the physical movement of the first camera. For example, second video surveillance camera 50 may capture the physical movement of video surveillance camera 12. In 306, the movement of the first camera can be compared to the stored security information. This could involve video server 30 comparing the physical movement of video surveillance camera 12 to the stored security information in lighting policy 40. In 308, the system is configured to determine if the movement of the first camera matches the stored security information. If the video server determines that the movement of the first camera matches the stored security information, then the system can continue to compare the movement of the first camera to the stored security information, as depicted in 306. However, if the system determines that the movement of the first camera does not match the stored security information, then the system can undergo any suitable remedial action, as illustrated in 310.

Figure 4A:
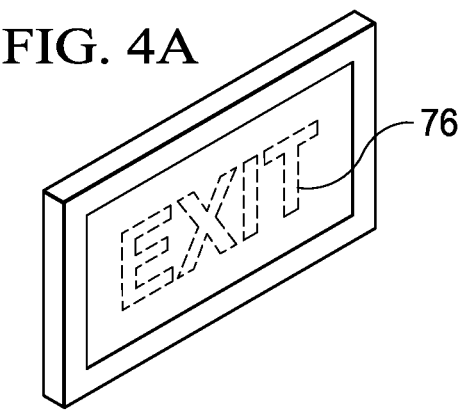
FIG. 4A is another simplified schematic diagram illustrating one potential operation associated with one embodiment of the present disclosure.

FIG. 4A is a simplified schematic diagram illustrating one possible example of a static object (e.g., a sign 76 that is representative of a type of security module), which can be the focus of a validation activity. While the word "EXIT" is shown on sign 76, sign 76 may display any combination of words, numbers, letters, or symbols. The intensity and/or color of the light emitted from the word "EXIT" in sign 76 may be modulated, or each letter in sign 76 may be modulated independent of (or in concert with) the other letters. For example, the intensity of the letter "E" may be modulated by lighting controller 46, while the remaining letters "XIT" may not be modulated, or the intensity of the letters may be sequentially modulated by lighting controller 46 to create a scrolling effect. In another example, the color of each letter may be modulated by lighting controller 46 independent of (or in concert with) the other letters. In one particular embodiment, the light emitted from sign 76 is infrared light or some other emission not detectable by an observer, but that is detectable by video surveillance camera 12.

Figure 4B:
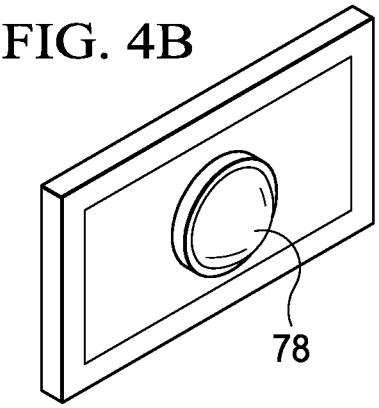
FIG. 4B is another simplified schematic diagram illustrating one potential operation associated with one embodiment of the present disclosure.

FIG. 4B is a simplified schematic diagram illustrating another possible example of a static object that can be used to validate video in the architecture discussed herein. In this particular example, a security light 78 is used, where the intensity and/or color of the light emitted from security light 78 may be suitably modulated. For example, the intensity of security light 78 may be modulated by lighting controller 46. In another example, the color of security light 78 may be modulated by lighting controller 46. In yet another example, both the intensity and the color of the light emitted from security light 78 may be modulated by lighting controller 46. In one specific implementation, the light emitted from security light 78 is infrared light, or some other emission that is not detectable by an observer, but that is detectable by video surveillance camera 12.

Figure 4C:
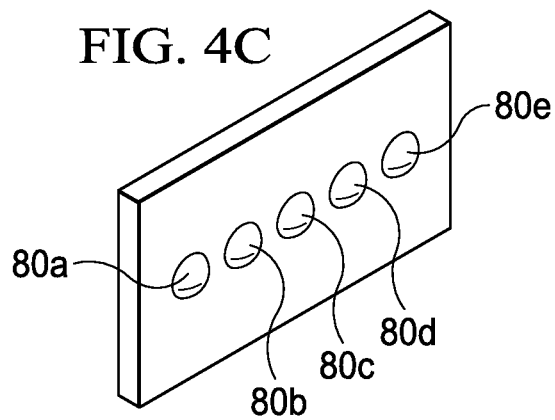
FIG. 4C is another simplified schematic diagram illustrating one potential operation associated with one embodiment of the present disclosure.

FIG. 4C is a simplified schematic diagram illustrating a set of security lights 80a-80e. The intensity and/or color of the light emitted from each security light 80a-80e may be modulated independent of (or in concert with) each other. For example, the intensity of security light 80a may be modulated by lighting controller 46, while the remaining security lights 80b-80e may not be modulated. The intensity of each security light 80a-80e may be modulated in a pseudorandom order, or the intensity of each security light 80a-80e may be sequentially modulated by lighting controller 46 to create a scrolling effect. In another example, the color of each security light 80a may be modulated by lighting controller 46 independent of (or in concert with) the other security lights 80b-80e. In one particular embodiment, the light emitted from security lights 80a-80e is infrared light or some other emission that is not detectable by an observer but that is detectable by video surveillance camera 12.

Figure 4D:
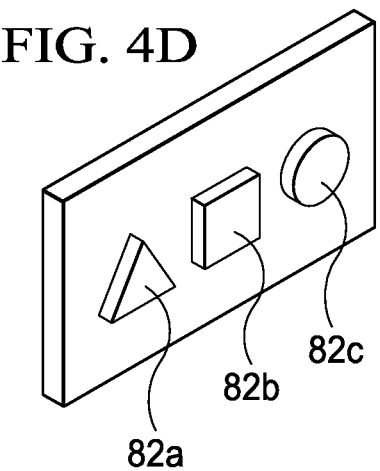
FIG. 4D is another simplified schematic diagram illustrating one potential operation associated with one embodiment of the present disclosure.

FIG. 4D is a simplified schematic diagram illustrating another possible example of a security module, which is depicted as a set of security shapes 82a-82c. The intensity and/or color of the light emitted from each security shape 82a-82c may be modulated independent of (or in concert with) each other. For example, the intensity of security shape 82a may be modulated by lighting controller 46, while the remaining security shapes 82b and 82c may not be modulated. The intensity of each security shape 82a-82c may be modulated in a pseudorandom order, or the intensity of each security shape 82a-82c may be sequentially modulated by lighting controller 46 to create a scrolling effect. In another example, the color of each security shape 82a may be modulated by lighting controller 46 independent of (or in concert with) the other security shapes 82b and 82c, and the color of each security shape 82a-80c may be modulated in a pseudorandom order. In yet another example, the shape of each security shape 82a-82c may be modulated. For example, while security shape 82a is illustrated as a triangle, in a next modulation, security shape 82a may be a square or a circle. In one particular embodiment, the light emitted from security shapes 82a-82c is infrared light, or some other emission that is not detectable by an observer, but that is detectable by video surveillance camera 12.

Figure 4E:
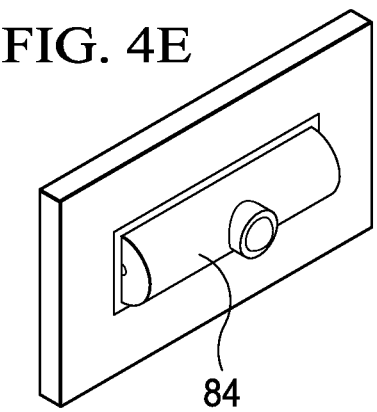
FIG. 4E is another simplified schematic diagram illustrating one potential operation associated with one embodiment of the present disclosure.

FIG. 4E is a simplified schematic diagram illustrating a security light 84, which is indicative of another type of security module. Similar to that described above, the direction and angle of the light emitted from security light 84 can be modulated, as well as the intensity and/or color of the light emitted from security light 84. For example, the direction of the light emitted from security light 84 may be modulated by lighting controller 46, where the modulated direction is sufficient to be detected. In another example, the angle of the light emitted from security light 84 may be modulated by lighting controller 46, where the modulated angle is sufficient to be detected. In yet another example, the intensity of security light 84 may be modulated by lighting controller 46. In yet another example, the color of security light 84 may be modulated by lighting controller 46. In one particular embodiment, the light emitted from security light 84 is infrared light, or some other emission that is not detectable by an observer, but that is detectable by video surveillance camera 12.

Figure 5:
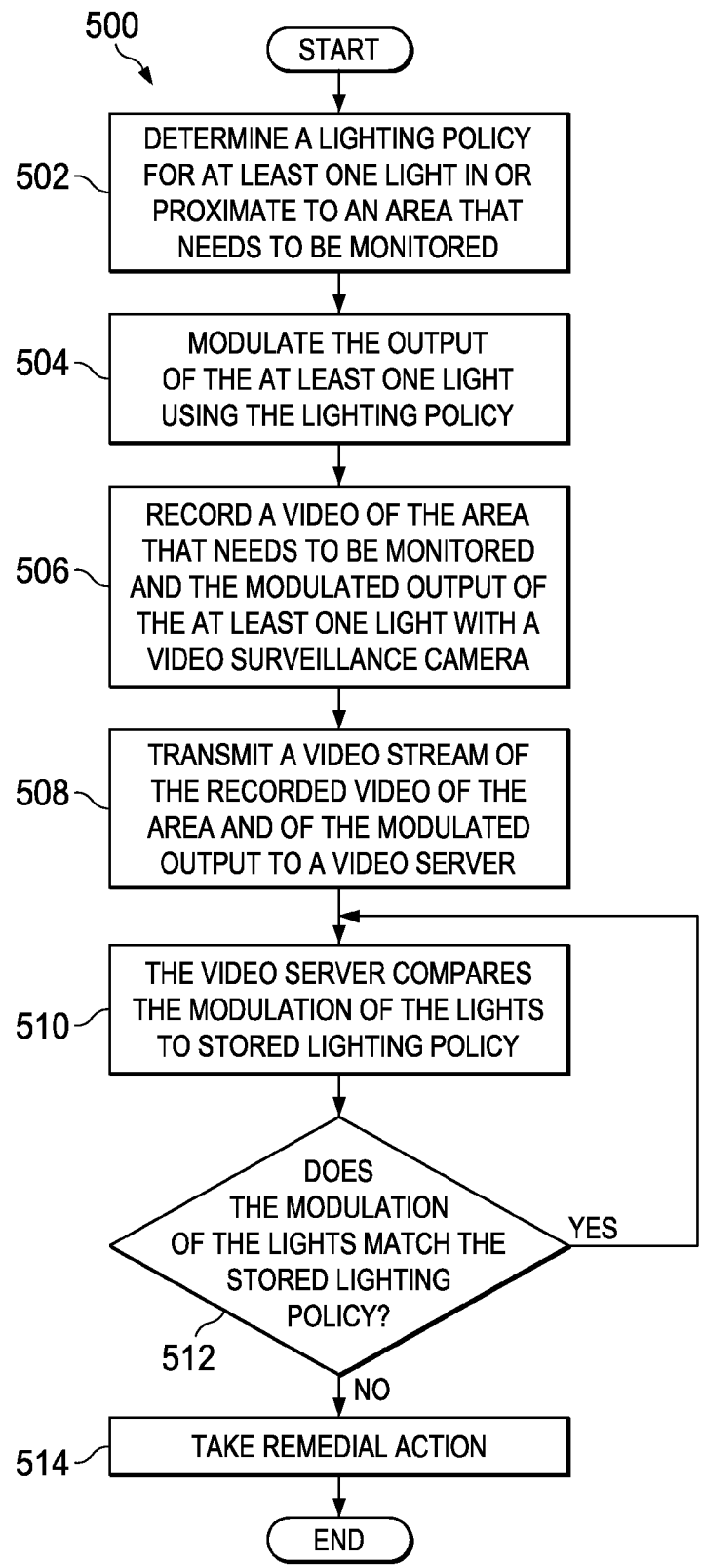
FIG. 5 is a simplified flow diagram illustrating potential operations associated with one embodiment of the present disclosure.

Turning to FIG. 5, FIG. 5 is a simplified flowchart 500 illustrating one potential operation associated with the present disclosure. In 502, a lighting policy is determined for at least one light in (or proximate to) an area needing monitoring. For example, from GUI 60, administrator 48 can access and modify lighting controls 62 for floodlights 14, room light 16, and/or security module 28. The set lighting control can be communicated to lighting controller 46 and video server 30 through network 23, or by using a portable storage device such as a USB flash drive. In 504, the output of at least one light is modulated using the lighting policy. For example, the output of floodlights 14, room light 16, and/or security module 28 may be modulated using lighting control module 44 in lighting controller 46.

In 506, a video of the area that needs to be monitored and the modulated output of the at least one of the lights is recorded with a video surveillance camera. In 508, a video stream of the recorded video of the area to be monitored and of the modulated output of the at least one light is transmitted to a video server. In 510, the video server compares the modulation of the lights to stored image characteristics. In 512, the video server determines if the modulation of the lights matches the stored image characteristics. If the video server determines that the modulation of the lights matches the stored image characteristics, then the video server continues to compare the modulation of the lights to stored image characteristics, as depicted in 510. However, if the video server determines that the modulation of the lights does not match the stored image characteristics, then the video server takes remedial action, as illustrated in 514.

Note that in certain example implementations, the video validating functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2A] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, lighting controller 46 and/or video server 38 may include software (e.g., provisioned as video feed analyzer module 38, lighting policy 40, etc.) in order to achieve the video validating functions outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of these elements (e.g., video server 30 and lighting controller 46) can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that video security system 10 (and its teachings) are readily scalable and can accommodate a large number of components, as well as more complicated/sophisticated arrangements and configurations. Accordingly, the examples provided should not limit the scope or inhibit the broad teachings of video security system 10 as potentially applied to a myriad of other architectures.

It is also important to note that the steps in the preceding flow diagrams illustrate only some of the possible scenarios and patterns that may be executed by, or within, video security system 10. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by video security system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in any type of video applications. This can include video feeds associated with aircraft monitoring, inventory monitoring, power plant monitoring, employment environments (e.g., in which machines or employees are monitored), or any other suitable scenario in which video data may be vulnerable to some type of corruption. The architecture of the present disclosure can readily be used in any such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving video data that includes emitted light captured by a camera at a location;
   validating authenticity of the video data by analyzing security characteristics of the emitted light captured by the camera, wherein the security characteristics of the emitted light captured by the camera are compared to expected security characteristics of the emitted light at the location; and
   taking remedial action when the security characteristics of the emitted light captured by the camera do not match at least one of the expected security characteristics of the emitted light at the location.

2. The method of claim 1, wherein the taking remedial action includes triggering an alert.

3. The method of claim 1, wherein the emitted light lights a static object, and the analyzing the security characteristics of the emitted light includes evaluating a reflection on the static object at the location.

4. The method of claim 1, wherein the expected security characteristics of the emitted light at the location are selected from a group consisting of:
   a) an intensity of the emitted light;
   b) color characteristics of the emitted light;
   c) a shape of the emitted light;
   d) an angle of the emitted light;
   e) an angle associated with a light source associated with the emitted light; and
   f) a modulation characteristic associated with the emitted light.

5. The method of claim 1, wherein validating authenticity of the video data includes analyzing a particular area of frames of the video data.

6. The method of claim 1, further comprising:
   modulating an output of at least one light source at the location to set the expected security characteristics of the emitted light at the location.

7. The method of claim 1, further comprising:
   receiving second video data that includes emitted light captured by a second camera at the location;
   validating authenticity of the second video data by analyzing security characteristics of the emitted light captured by the second camera, wherein the security characteristics of the emitted light are compared to the expected security characteristics of the emitted light at the location; and
   taking remedial action when the security characteristics of the emitted light captured by the second camera do not match at least one of the expected security characteristics of the emitted light at the location.

8. A non-transitory media encoded with logic that includes code for execution and when executed by a processor operable to perform operations comprising:
   receiving video data that includes emitted light captured by a camera at a location;
   validating authenticity of the video data by analyzing security characteristics of the emitted light captured by the camera, wherein the security characteristics of the emitted light captured by the camera are compared to expected security characteristics of the emitted light at the location; and
   taking remedial action when the security characteristics of the emitted light captured by the camera do not match at least one of the expected security characteristics of the emitted light at the location.

9. The non-transitory media of claim 8, wherein the taking remedial action includes triggering an alert.

10. The non-transitory media of claim 8, wherein the emitted light lights a static object, and the analyzing the security characteristics of the emitted light includes evaluating a reflection on the static object at the location.

11. The non-transitory media of claim 8, wherein the expected security characteristics of the emitted light at the location are selected from a group consisting of:
    a) an intensity of the emitted light;
    b) color characteristics of the emitted light;
    c) a shape of the emitted light;
    d) an angle of the emitted light;
    e) an angle associated with a light source associated with the emitted light; and
    f) a modulation characteristic associated with the emitted light.

12. The non-transitory media of claim 8, wherein validating authenticity of the video data includes analyzing a particular area of frames of the video data.

13. The non-transitory media of claim 8, the operations further comprising:
    modulating an output of at least one light source at the location to set the expected security characteristics of the emitted light at the location.

14. The non-transitory media of claim 8, the operations further comprising:
    receiving second video data that includes emitted light captured by a second camera at the location;
    validating authenticity of the second video data by analyzing security characteristics of the emitted light captured by the second camera, wherein the security characteristics of the emitted light are compared to the expected security characteristics of the emitted light at the location; and
    taking remedial action when the security characteristics of the emitted light captured by the second camera do not match at least one of the expected security characteristics of the emitted light at the location.

15. An apparatus, comprising:
    a memory element configured to store data;
    a processor operable to execute instructions associated with the data, such that the apparatus is configured for:
       receiving video data that includes emitted light security characteristics captured by a camera at a location;
       validating authenticity of the video data by analyzing the security characteristics of the emitted light captured by the camera, wherein the security characteristics of the emitted light captured by the camera are compared to expected security information characteristics of the emitted light at the location; and
       taking remedial action when the security characteristics of the emitted light captured by the camera included in the video data do not match at least one of the expected security information characteristics of the emitted light at the location.

16. The apparatus of claim 15, wherein taking remedial action includes triggering an alert.

17. The apparatus of claim 15, wherein the emitted light lights a static object, and the analyzing the security characteristics of the emitted light includes evaluating a reflection on the static object at the location.

18. The apparatus of claim 15, wherein the video data being analyzed is a particular area of frames of the video data.

19. The apparatus of claim 15, further comprising:
   a graphical interface configured for modulating an output of at least one light source at the location to set the expected security characteristics of the emitted light at the location.

20. The apparatus of claim 15, wherein second video data that includes security characteristics of the emitted light captured by a second camera at the location is received from the second camera, authenticity of the second video data being validated by analyzing the security characteristics of the emitted light captured by the second camera at the location, wherein the security characteristics of the emitted light are compared to the expected security characteristics of the emitted light, and wherein remedial action is taken when the security characteristics of the emitted light in the second video data do not match at least one of the expected security characteristics of the emitted light at the location.

* * * * *